Figure 1:
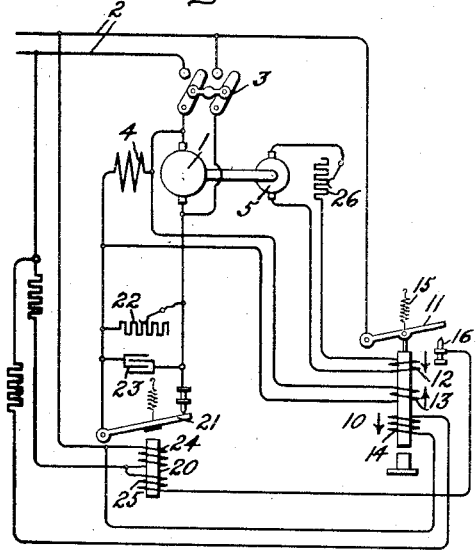

Jan. 9, 1923.

F. A. BYLES.
SPEED CONTROL OF D. C. MOTORS.
FILED AUG. 30, 1920.

1,441,482

Inventor:
Frank A. Byles,
by
His Attorney.

Patented Jan. 9, 1923.

1,441,482

UNITED STATES PATENT OFFICE.

FRANK A. BYLES, OF SCHENECTADY, NEW YORK, ASSIGNOR TO GENERAL ELECTRIC COMPANY, A CORPORATION OF NEW YORK.

SPEED CONTROL OF D. C. MOTORS.

Application filed August 30, 1920. Serial No. 406,802.

*To all whom it may concern:*

Be it known that I, FRANK A. BYLES, a citizen of the United States, residing at Schenectady, in the county of Schenectady, State of New York, have invented certain new and useful Improvements in Speed Control of D. C. Motors, of which the following is a specification.

My invention relates to the speed control of direct current motors and more especially to the adaptation of a vibratory regulator for this purpose.

It is well known that the speed of a direct current motor may be controlled by varying the field excitation, as by means of a resistance in series with the shunt field winding of the motor. In order to maintain the speed of a motor constant it has been a practice to control this resistance by an electrically operated switch arranged to insert and remove the resistance from the field circuit, the resultant effect being determined by the relative length of time during which the resistance is left in circuit. The solenoid which operates the switch is energized from a generator driven by the motor. With such an arrangement, however, there must be an actual change of speed before the regulator can be set into operation and the result will be a fluctuation of speed above and below the exact speed desired. This fluctuation or hunting is undesirable since it may readily be cumulative and produce a considerable speed variation.

The object of my invention is to provide an arrangement which will hold the speed of a direct current motor constant at any desired value without any fluctuation or hunting.

A further object of my invention is to provide an arrangement which will hold the speed of the motor constant independently of voltage fluctuations in the supply circuit.

According to my invention a regulator of the Tirrill type is used to control a relay which short circuits a resistance in the field circuit of the motor. The regulator is provided with two cooperating contacts and a plurality of solenoids controlling the engagement of said contacts. One of the solenoids is supplied with current from a generator driven by the motor. Another of said solenoids is supplied with a current proportional to the field current of the motor and is arranged so as to oppose the action of the first mentioned solenoid. Opposing the second mentioned solenoid, I also provide a compensating solenoid supplied with a current proportional to the voltage impressed across the motor armature.

My invention will be better understood from the following description taken in connection with the accompanying drawings, and its scope will be pointed out in the appended claims.

Figure 2:
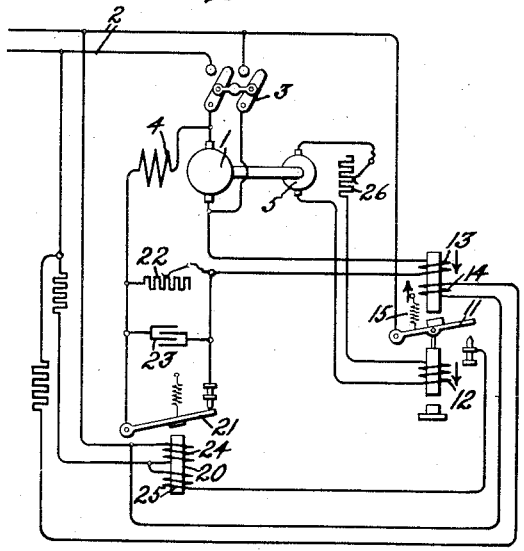
Figure 3:
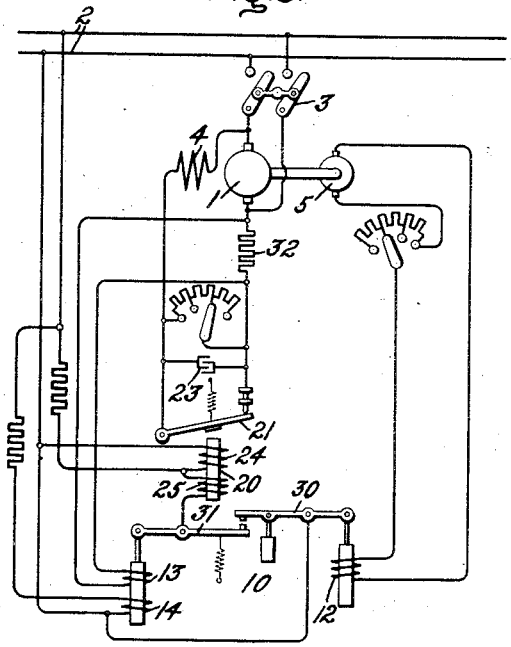

Referring to the drawings, Fig. 1 is a diagrammatic view showing one arrangement of the apparatus involved in my invention; and Figs. 2 and 3 are modifications of the arrangement shown in Fig. 1.

Referring to Fig. 1, 1 represents a motor whose speed is to be regulated and, as shown, the motor is provided with an armature which is adapted to be connected to the supply mains 2 by means of a switch 3 so as to be supplied with current therefrom. The motor 1 is also provided with a shunt field winding 4. Obviously, the motor may be provided with a series field winding. Driven by the motor and here shown as mounted on the same shaft is a pilot generator 5. This generator may be of any size or type, but if its use is solely for the purpose of regulation it is preferably of the magneto type and of small size.

A regulator 10 whose arrangement constitutes the object of my invention is here shown as of the Tirrill type employing a stationary contact and a vibratory contact cooperating therewith and controlled by solenoids as will later appear. Such a construction is not essential and the regulator will operate to hold constant speed if both of the contacts are arranged to vibrate. In the form shown in this figure, a pivoted contact arm 11 is controlled by the solenoids 12, 13 and 14 and a spring 15. The solenoid 12 is supplied with current from the generator 5. The solenoid 13 is connected across the terminals of the shunt field winding 4 so as to be supplied with a current proportional to the field current of the motor and is wound so as to act differentially with the solenoid 12. The solenoid 14 is connected across the supply mains 12 and wound so as to oppose the solenoid 13.

In series with the generator 5 and the solenoid 12 there is connected an adjustable resistance 26 so that the current through the solenoid 12 may be varied to change the speed of the motor which is to be maintained.

Controlled by the contacts of the regulator 10 is a relay 20 acting upon a spring-held armature 21 arranged to short circuit a resistance 22 which is connected in series with the field winding 4. Preferably a condenser 23 is connected across the contacts of this relay so as to prevent sparking. The relay 20 is provided with the differentially wound coils 24 and 25. Coil 24 is connected directly across the supply mains 2 while the coil 25 is connected across the supply mains 2 when the movable arm 11 of the regulator is in engagement with the stationary contact 16.

The operation of the arrangement is as follows: Let us assume that the motor is running at some particular speed, say 1000 R. P. M. If the movable contact arm 11 is now held out of engagement with the stationary contact 16 the regulator 10 will have no effect upon the speed of the motor, since the coil 24 only of relay 20 is energized and therefore the resistance 22 will be constantly in circuit. If, however, the movable arm 11 is held in engagement with the stationary contact 16 of the winding 25 the relay 20 will be energized thereby causing the contacts of the relay 20 to close and complete the short circuit around the resistance 22. The excitation of the motor 1 is thereby increased whereupon the speed of the motor will decrease to a certain speed, say to 900 R. P. M.

Let us now assume that the contact arm 11 is released and that the resistance 26 is adjusted to hold the motor speed at 950 R. P. M. Then the voltage of the pilot generator 5 when the speed of the motor is above 950 R. P. M. will cause the movable arm 11 to engage the stationary contact 16 thereby causing the relay 20 to short circuit the resistance 22. The motor field is thereby increased which in turn causes the speed of the motor to decrease to a value slightly below 950 R. P. M. at which point the voltage of the pilot generator will have decreased to such a value that the spring 15 will pull the movable arm 11 out of engagement with the stationary contact 16. The motor field is then decreased thereby causing the speed of the motor to increase slightly above 950 R. P. M. The operation described will now be repeated and the speed of the motor will fluctuate up and down above and below 950 R. P. M. in an attempt to hold constant voltage on the pilot generator 5. Thus it can be seen that approximate speed regulation is obtained but that actual speed regulation cannot be obtained without an actual speed variation which in itself will give a tendency to hunt.

Now it will be evident that when the movable arm 11 is in engagement with the stationary contact 16 the field current of the motor will decrease and will tend to increase the speed of the motor. An appreciable change in the exciting current takes place, however, before the speed of the motor changes. Therefore, since the solenoid 13 opposes the solenoid 12 and is arranged so that it is supplied with current proportional to the field current, the engagement of the movable contact 11 with the stationary contact 16 results in the spring 15 pulling the movable contact arm 11 out of engagement with the stationary contact 16, before the exciting current changes enough to vary the speed of the motor. The opening of the circuit through contact 16 causes the contacts of the relay 20 to open, thereby decreasing the motor field current. This decrease in the field current tends to increase the speed of the motor. Before the speed of the motor changes, however, the field current will be decreased sufficiently to allow the solenoid 12 to pull the movable armature 11 into engagement with the stationary contact 16 and the previous operation is repeated. The movable arm 11 is, therefore, in constant vibration and the resultant effect is determined by the relative proportion of the time during which the movable contact arm 11 and the stationary contact 16 are in and out of engagement. From this description it is evident that the speed of the motor is regulated even though there is no change in the voltage of the pilot generator 5 which is the same as saying when there is no change in the speed of the motor.

Fluctuations in the voltage in the supply mains 2 would ordinarily cause a variation in the field current of the motor and thereby vary the effect of the winding 13. In order to compensate for this variation I provide the regulator with the solenoid 14 which is arranged to act differentially with the solenoid 13. If, for example, the voltage of the supply mains 2 increases thereby increasing the current in the field circuit of the motor and the solenoid 13 the current in the compensating solenoid 14 is also increased so that the change in the voltage has no effect upon the operation of the regulator.

In Fig. 2 the regulator is shown as having two cores connected so as to act in opposition to each other. On one of the cores the solenoid 12 is wound and on the other core the solenoids 13 and 14 are wound. In this figure the solenoid 13 is connected in series with the field winding 4 instead of in shunt therewith. Otherwise the arrangement is the same as that shown in Fig. 1.

In Fig. 3 the regulator 10 is shown as having two floating contacts instead of one as shown in Figs. 1 and 2. In the form shown, a pivoted contact arm 30 is controlled by the solenoid 12. The other contact arm 31 is controlled by the solenoids 13 and 14. In this figure the solenoid 13 is connected across the terminals of a resistance 32 which is inserted in series with the field winding 4. Otherwise the arrangement is the same as that shown in Figs. 1 and 2.

The operation of the arrangement shown in Figs. 2 and 3 is the same as that of the arrangement shown in Fig. 1 and therefore a detail description thereof is deemed unnecessary.

It will be evident that many modifications in the arrangements shown and described may be made by those skilled in the art, and therefore I do not desire to be limited to the particular arrangements shown but seek to cover in the appended claims all those modifications which fall within the spirit and scope of my invention.

What I claim as new and desire to secure by Letters Patent of the United States, is:—

1. In combination, a direct current motor provided with a shunt field winding, a generator driven by said motor, and a vibratory device adapted to control the current in said field winding, said device comprising a solenoid connected to said generator, and a second solenoid connected in the field circuit of said motor and arranged to oppose the effect of said first mentioned solenoid, and a third solenoid supplied with current proportional to the voltage supplied to the motor and arranged to oppose the effect of said second mentioned solenoid.

2. In combination, a direct current motor provided with a shunt field winding, a generator driven by said motor, a resistance in the circuit of said field winding, and a vibratory device adapted to control the current in said field winding, said device comprising a solenoid connected to said generator, and a second solenoid connected in shunt with said resistance and arranged to oppose the effect of said first mentioned solenoid, and a third solenoid supplied with current proportional to the voltage supplied to the motor and arranged to oppose the effect of said second mentioned solenoid.

In witness whereof, I have hereunto set my hand this 27th day of August, 1920.

FRANK A. BYLES.